United States Patent Office

3,565,696
Patented Feb. 23, 1971

1

3,565,696
ACID ADDITIVE FOR RECHARGEABLE BATTERIES EMPLOYING AN ORGANIC DEPOLARIZER
George F. Nordblom, Yardley, Pa., assignor to ESB Incorporated, a corporation of Delaware
No Drawing. Filed Nov. 1, 1968, Ser. No. 772,827
Int. Cl. H01m *15/06, 43/06*
U.S. Cl. 136—137                                    10 Claims

ABSTRACT OF THE DISCLOSURE

An electric battery having an azodicarbonamide compound as the depolarizer in which boric acid is added to the cathode (depolarizer) mix to improve the efficiency of the azodicarbonamide compounds as a depolarizer, to improve the stability of the azodicarbonamide compounds, and to improve battery cycle life. The boric acid may be dry blended with the cathode mix and/or dissolved (it has limited solubility) in the electrolyte which is added to the cathode mix. The boric acid may be added to the cathode mix in amounts ranging from about 1 to about 20% by weight of dry cathode mix and/or dissolved in the electrolyte in amounts up to saturation (about 6% by weight). The boric acid is effective for both substituted and unsubstituted azodicarbonamide compounds when they are used as battery depolarizers.

BACKGROUND OF THE INVENTION

In the electric battery art, both primary and secondary cells have achieved substantial commercial success. Primary cells are electrochemical devices in which the chemical reaction for converting chemical energy into electrical energy is not reversible, i.e. it is not practical to reverse the reaction by recharging the cell with electrical energy. Secondary cells convert chemical energy into electrical energy by reversible chemical reactions and are generally recharged repeatedly by applying electrical energy to the discharged cell to reconvert the reaction products into their charged state.

Primary and secondary cells generally comprise a negative electrode (anode), a positive electrode (cathode), a separator between said electrodes, and an electrolyte. The negative electrode is usually made of a metal such as zinc, magnesium, aluminum, cadmium, lead, etc., and alloys thereof, and positive electrodes are inorganic or organic oxidizing agents which may also contain a conductive material such as carbon. The positive electrode is commonly referred to as a depolarizer and many compounds which are readily reducible and have high oxidizing potentials have been tried as depolarizers.

In the standard flashlight battery, also known as the Le Clanche cell, the negative electrode is a zinc can which also functions as the cell container, the depolarizer is manganese dioxide mixed with a conductive carbon and an ammonium chloride/zinc chloride electrolyte solution, and a paste of starch and flour, paper, or other electrolyte absorbent material is used as the separator. There have been many attempts to develop depolarizers for both primary and secondary cells which have improved shelf-life, useful voltages, and rechargeability (particularly after complete discharge).

U.S. Pat. No. 3,357,865 which issued to Stanley M. Davis, Charlotte M. Kraebel and Richard A. Parent on Dec. 12, 1967 discloses that substituted azodicarbonamide compounds have been found to be effective depolarizer materials for both primary and secondary cells. Azodicarbonamide compounds, both substituted and unsubstituted, are particularly useful depolarizers for they are readily recharged after deep discharges. Initial attempts to use azodicarbonamide compounds as depolarizers in cells having a standard Le Clanche dry cell construction and electrolyte, with the azodicarbonamide compound substituted for the manganese dioxide depolarizer, were not particularly successful for the cells had poor cycle life and cell efficiency deteriorated rapidly. In addition, gassing of the cells during storage and instability of the organic depolarizer material were also problems.

SUMMARY OF THE INVENTION

It is the general purpose of this invention to provide an additive for an electric battery employing an organic depolarizer of the azodicarbonamide type which improves battery efficiency and cycle life, and which decreases gassing and stabilizes the organic depolarizer. The additive found to be effective in accordance with this invention is boric acid ($H_3BO_3$) which has limited solubility in the Le Clanche type electrolyte used in batteries employing an azodicarbonamide depolarizer. The boric acid may be dry blended with the other ingredients of the cathode mix prior to adding the electrolyte, and/or it may be dissolved in the electrolyte which is subsequently added to the cathode mix. It is particularly preferred to saturate the electrolyte with boric acid and to add a substantial amount to the dry cathode mix. It has been found that boric acid incorporated into the cathode mix in amounts ranging from about 1 to about 20% by weight of the dry cathode mix increases cell efficiency and cycle life. In addition, the boric acid reduces gassing of the azodicarbonamide depolarizer in the presence of the electrolyte and thereby increases its stability and improves battery storage life.

DESCRIPTION OF THE PREFERRED EMBODIMENT

The boric acid additive of this invention is useful in both primary and secondary batteries which employ an azodicarbonamide compound as the depolarizer. Both substituted (U.S. Pat. No. 3,357,865) and unsubstituted azodicarbonamide materials are useful as depolarizers in electric batteries, and these azodicarbonamide depolarizers may be generally represented by the following formula:

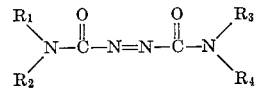

where $R_1$, $R_2$, $R_3$ and $R_4$ may be hydrogen, alkyl of 1 to 8 carbon atoms, mono- and dicarbocyclic aryl or substituted aryl, cycloalkyl, aralkyl, alkoxyalkyl, cyanoalkyl, haloalkyl, nitroalkyl, alkenyl, and where $R_1$ and $R_2$ and/or $R_3$ and $R_4$ when alkyl may be joined together through a nitrogen, sulfur or oxygen linkage to form a heterocyclic ring. Unsubstituted azodicarbonamide, when $R_1$, $R_2$, $R_3$ and $R_4$ are all hydrogen, is also useful as a depolarizer material in accordance with this invention, when used either alone or in combination with substituted azodicarbonamide compounds. The preferred azodicarbonamide compounds are those in which the nitrogen atoms carry an alkyl radical of 1 to 4 carbon atoms. As disclosed in U.S. Pat. No. 3,357,865, it is possible to use a substituted or unsubstituted biurea and oxidize it to the corresponding azodicarbonamide compound by charging the cell in the presence of an appropriate catalyst, thereby forming a charged azodicarbonamide depolarizer in situ in the cell. Furthermore, mixtures of the azodicarbonamide compounds may be used as well as the compounds individually.

The azodicarbonamide compounds are present in the cathode mix in amounts ranging from about 10 to about 70% by weight of the total dry mix. The cathode mix also contains electrolyte solution and highly conductive carbon such as graphite, acetylene black or other high surface area carbon blacks.

The electrolyte solution generally comprises an aqueous solution containing a soluble salt such as halide salts or mixtures thereof. The cations of these salts may comprise an ammonium radical or metallic ions such as zinc, manganese, etc. It is preferred to use a conventional Le Clanche electrolyte which comprises an aqueous solution of ammonium chloride and zinc chloride. The electrolyte concentration does not appear to be critical, although for best results certain concentrations may be preferred depending upon the particular salt and battery requirements. In general, standard Le Clanche electrolyte concentrations have given satisfactory performance. As an example, one liter of electrolyte may be prepared by dissolving 145 grams of zinc chloride and 280 grams of ammonium chloride in distilled water.

The anode active material may be selected from metals such as zinc, magnesium, aluminum or other electropositive metal, including mixtures or alloys thereof. Zinc or zinc alloys are generally the preferred anode metals and these may be used as cans or containers in a manner similar to that used in conventional flashlight batteries.

Satisfactory battery performance is achieved using a laminated separator comprising a semi-permeable membrane barrier laminated to an absorbent material. Cellophane may be used as the barrier material, and the absorbent material may be selected from conventional Le Clanche separator materials such as kraft paper, starch and flour paste, and other gelling agents, e.g. carboxymethyl cellulose and polyacrylamide resins. Particularly outstanding results are achieved using an absorbent material comprising a thermoplastic resin as a continuous binder matrix for a gelling agent such as a starch-flour mixture, carboxymethyl cellulose, etc.

In accordance with this invention, the efficiency and storage characteristics of batteries employing an azodicarbonamide depolarizer material are substantially improved by adding boric acid to the dry cathode mix, the electrolyte, or both. It is believed that the boric acid mixed with the azodicarbonamide depolarizer acts as a source of hydrogen ions to improve the efficiency of the discharge reaction. Since the boric acid has limited solubility in the electrolyte (Le Clanche), most of the boric acid added to the cathode mix remains in contact with the depolarizer particles, particularly when the electrolyte is previously saturated with boric acid. An additional advantage of the boric acid additive is that as it loses its hydrogen ions to the azodicarbonamide compound forming the corresponding biurea compound, the borate ions react with the metallic anode material (zinc) to form a relatively insoluble metal borate which provides a buffer for the opposite reaction. Upon recharging the battery, the biurea compound releases hydrogen ions and reforms boric acid without decreasing the pH so drastically as to interfere with the charge acceptance of the anode and cathode active materials.

It has been observed that boric acid is particularly effective when the battery is being discharged and/or charged at high rates. At high rate discharge, relatively large amounts of hydrogen ions are required to reduce the azodicarbonamide compound and the boric acid functions as an additional source of hydrogen ions and thereby promotes cell or battery efficiency. Upon low rates of charge or discharge, hydrogen diffusion through the electrolyte is generally sufficient to control the efficiency.

The boric acid may be incorporated into the cathode mix by dry blending with the azodicarbonamide compound and/or the conductive carbon ingredient prior to adding the electrolyte to the cathode mix. Alternatively, the boric acid may be dissolved in the electrolyte, in amounts up to saturation of the electrolyte (about 6% by weight), which is subsequently incorporated into the cathode mix. Since the boric acid functions by donating hydrogen ions to the azodicarbonamide compound and is soluble to only a limited extent in the electrolyte, it is generally preferred to dry blend it with the azodicarbonamide compound in order to get a more intimate and adequate mixture.

It has been found that the boric acid is an effective additive when incorporated into the cathode mix in amounts ranging from about 1 to about 20% by weight of the dry cathode mix. The boric acid improves the battery efficiency, particularly at high charge and discharge rates, and it increases cycle life. In addition, the boric acid reduces gassing of the azodicarbonamide material in the presence of the electrolyte and thereby improves the storage life.

This invention is further described in the following examples which illustrate the improvements provided by adding boric acid to the cathode mix in batteries using azodicarbonamide compounds as the depolarizer.

Example I

A depolarizer mix comprising one part by weight of azodicarbonamide and one part by weight of high surface area carbon black was mixed with Le Clanche electrolyte (17% $ZnCl_2$, 27% $NH_4Cl$ and the balance is water) and discharged against a zinc anode. 9% by weight of boric acid was added to the depolarizer mix of one cell whereas the control cell contained no additive. The separator was a paper-cellophane laminate. 0.2 gram of the depolarizer mixture was used in each cell. The cells were discharged at 50 milliamperes continuously until the voltage dropped from 1.35 v. to a cut-off voltage of 0.75 v. The milliampere-hours capacity was determined and compared to the theoretical capacity of the azodicarbonamide (463 ma.h./g.) in order to calculate the percent cell efficiency. After each discharge, the cells were recharged at 1.6 v. and 30 milliamperes maximum current for 16 hours. The following table reports the results for cells with and without boric acid:

| Discharge | Percent cell efficiency | |
|---|---|---|
| | Cell with $H_3BO_3$ | Control cell |
| Initial | 83.2 | 92.8 |
| 2 | 79.2 | 73.6 |
| 3 | 67.3 | 72.5 |
| 4 | 81.9 | 62.1 |
| 5 | 70.2 | 55.2 |
| 6 | 76.9 | 30.0 |
| 7 | 73.3 | 30.7 |
| 8 | 68.9 | 43.1 |
| 9 | 68.2 | 40.6 |
| 10 | 69.1 | 37.4 |

These results indicate that though the control cell had better initial efficiency, it rapidly deteriorated so that the cell with boric acid had significantly better efficiency for all but one subsequent discharge.

Example II

After completion of the test in Example I, the cells were inspected and it was noted that the cathode (depolarizer) mix indicated that there was poor wetting of the mix by the electrolyte. In order to improve the wetting of the mix, one drop of an alkyl phenoxy polyethoxy ethanol wetting agent (Triton X–100) was added to 100 ml. of the electrolyte, which was also saturated with boric acid, and the amount of boric acid dry blended with the depolarizer mix was increased to 13%. The test was repeated using the same procedure as in Example I.

Discharge:     Cell with 13% $H_3BO_3$ percent cell eff.
Initial ---- 99.6
2 ---- 85
3 ---- 63
4 ---- 84
5 ---- 87
6 ---- 79
7 ---- 97

Comparing these results with those of Example I, it is apparent that the initial cell efficiency was significantly improved and this improvement was substantially maintained during later discharge.

Example III

The effect of boric acid on the gassing rate or stability of azodicarbonamide in electrolyte was also tested. The basic (control) mix comprised 3.0 g. of azodicarbonamide (ADCA), 0.8 g. of high surface area carbon black and 2.4 ml. of standard Le Clanche electrolyte (17% $ZnCl_2$ and 27% $NH_4Cl$). The test was carried out for 30 days at 45° C. and the amount of depolarizer decomposed was determined.

| Mix: | Percent ADCA decomposed |
|---|---|
| Control mix | 29.5 |
| Control mix+0.2 g. $H_3BO_3$ | 16.7 |
| Control mix+0.75 g. $H_3BO_3$ | 11.9 |

These results indicate that the boric acid significantly improved the stability of the azodicarbonamide depolarizer.

Having completely described this invention, what is claimed is:

1. In an electric battery having an anode, a cathode mix comprising an azodicarbonamide compound as the depolarizer, conductive carbon particles and an aqueous electrolyte solution of ammonium chloride and zinc chloride, and a separator between said anode and cathode, the improvement comprising boric acid in said cathode mix in an amount ranging from about 1 to about 20% by weight of the dry cathode mix whereby the battery efficiency is improved and the stability of the azodicarbonamide depolarizer is improved.

2. A battery in accordance with claim 1 in which the aqueous electrolyte solution contains boric acid dissolved therein in addition to the boric acid incorporated in the cathode mix.

3. A battery in accordance with claim 1 in which the anode is zinc or a zinc alloy.

4. A battery in accordance with claim 1 in which the depolarizer is azodicarbonamide substituted with from 1 to 4 alkyl groups having from 1 to 4 carbon atoms.

5. A battery in accordance with claim 1 in which the azodicarbonamide compound is dibutyl azodicarbonamide.

6. A battery in accordance with claim 1 in which the anode is zinc or a zinc alloy, the cathode mix comprises dibutyl azodicarbonamide as the depolarizer.

7. In an electric battery having an anode, a cathode mix comprising an azodicarbonamide compound as the depolarizer, conductive carbon particles and an aqueous electrolyte solution of ammonium chloride and zinc chloride, and a separator between said anode and cathode, the improvement comprising boric acid in said aqueous electrolyte in amounts up to saturation of the electrolyte.

8. A battery in accordance with claim 7 in which the depolarizer is azodicarbonamide substituted with from 1 to 4 alkyl groups having from 1 to 4 carbon atoms.

9. A battery in accordance with claim 7 in which the azodicarbonamide compound is dibutyl azodicarbonamide.

10. A battery in accordance with claim 7 in which the anode is zinc or a zinc alloy, the cathode mix comprises dibutyl azodicarbonamide as the depolarizer.

References Cited

UNITED STATES PATENTS

| 2,306,927 | 11/1942 | Arsem | 136—137 |
| 3,357,865 | 12/1967 | Davis et al. | 136—137 |

DONALD L. WALTON, Primary Examiner

U.S. Cl. X.R.

136—155